(12) United States Patent
Lin

(10) Patent No.: US 7,407,320 B1
(45) Date of Patent: Aug. 5, 2008

(54) BLENDER WITH SAFETY DEVICE

(76) Inventor: Kuan-Chih Lin, P.O. Box 8-71, Tainan 71052 (TW)

( * ) Notice: Subject to any disclaimer, the term of this patent is extended or adjusted under 35 U.S.C. 154(b) by 0 days.

(21) Appl. No.: 11/838,250

(22) Filed: Aug. 14, 2007

(51) Int. Cl.
*A47J 43/07* (2006.01)
*A47J 43/046* (2006.01)

(52) U.S. Cl. .................... 366/206; 241/37.5

(58) Field of Classification Search ......... 366/205–206, 366/314, 601; 99/348; 241/37.5
See application file for complete search history.

(56) References Cited

U.S. PATENT DOCUMENTS

| | | | | |
|---|---|---|---|---|
| 5,567,049 | A * | 10/1996 | Beaudet et al. | 366/206 |
| 6,513,966 | B1 * | 2/2003 | Gort-Barten et al. | 366/205 |
| 6,540,394 | B2 * | 4/2003 | Juriga | 366/205 |
| 6,554,466 | B1 * | 4/2003 | Lee | 366/206 |
| 6,568,843 | B1 * | 5/2003 | Lai | 366/206 |
| 6,629,492 | B1 * | 10/2003 | Li | 99/348 |
| 6,637,681 | B1 * | 10/2003 | Planca et al. | 241/37.5 |
| 6,715,706 | B1 * | 4/2004 | Planca et al. | 241/36 |
| 6,910,800 | B2 * | 6/2005 | Wu | 366/199 |

FOREIGN PATENT DOCUMENTS

| | | | |
|---|---|---|---|
| DE | 102005040513 A1 * | 3/2007 | |
| DE | 2865623 A1 | 3/2008 | |
| DE | 102005040509 A1 * | 3/2008 | |
| DE | 102005040525 A1 * | 3/2008 | |
| FR | 2865623 A1 * | 8/2005 | |
| FR | WO 2007023116 A1 | 3/2007 | |
| WO | WO 2007023116 A1 * | 3/2007 | |

* cited by examiner

Primary Examiner—Charles E Cooley

(57) ABSTRACT

A juicer safety device includes a sidearm formed with the container and having a groove in a sidewall, a contact member on an upper surface of a chamber, a spring on the contact member, a position guide member in a sidewall of the chamber, and two projecting ridges with a slide groove between them; a push rod kept in position by the contact member, the position guide member and the two projecting ridges and having a projecting block provided with a stop edge at a first side and a guide block fitting in the slide groove; a cap with a contact block is closed on the container and then rotated to let a contact block insert in the sidearm and push the push rod downwards so that a contact rod of the push rod moves downwards, touching and turning on a micro switch, which turns on the juicer to operate.

1 Claim, 6 Drawing Sheets

BLENDER WITH SAFETY DEVICE

BACKGROUND OF THE INVENTION

1. Field of the Invention

This invention relates to a juicer safety device, particularly to one provided with a cap closing on a container, and the cap is to be rotated for forcing a contact block to move in a chamber of a sidearm and push down a push rod, which then moves down a contact rod to contact and turn on a micro switch to start the juicer. It is very convenient to use and very safe to handle.

2. Description of the Prior Art

Conventional juicers generally have no safety device, starting to operate once turned on, and users often start them with a cap not yet closed on a container, causing smashed fruit bits and fruit juice in the container to splash out. Moreover, if a young child should dare to use it without parents not at the site, the child might put a hand into the container during operation to cause a dangerous accident.

There is a juicer disclosed in a U.S. Pat. No. 6,554,466 B1, as shown in FIGS. 1 and 2, which includes a main base 1, a container 10 set on the main base 1, a sidearm 11 with a chamber 12 formed at a side of the container 10, a slide groove 110 formed in a top surface of the sidearm 11, and a push button 13 fixed on an upper portion of the sidearm 11. The push button 13 has a inclined front side with a fitting groove 130, a spring 131 placed behind the push button 13, which has one end hooked at an inner wall of the chamber 12 of the sidearm 11. Further, a cap 14 closes on the container 10, and a press projection 140 formed downward on an underside of an outer edge of the cap 14 and fitting in the fitting groove 130 of the push button 13. The press projection 140 has a sloped sidewall, and a connect rod 15 is provided in the chamber 12 of the sidearm 11, having a projection 150 on an upper end, and a spring 151 set under the upper end for pushing the connect rod 15 upward. The connect rod 15 has its lower end inserted in a lower portion of the container 10 and fixed with a contact rod 152, which extends into the main base 1 to be located just on a micro switch 160 fixed in a switch base 16, and a spring 153 is fitted around the contact rod 152 for pushing the connect rod 15 upward.

When the cap 14 is not yet closed on the container 10, the micro switch 160 is OFF, even the switch of the juicer is turned on. The cap 14 has to be closed and let the press projection 140 is aligned to the push button 13 and the slide groove 110, and then the cap 14 is pressed down to force the push button 13 to shift and let the press projection 140 inert into the sidearm 11 with the connect rod 15 kept on moving down so that the contact rod 152 at the lower end of the contact rod 152 may move down to touch the micro switch 160 for turning on the circuit. Then the juicer may start to operate for making juice.

However, the safety structure of the juicer of the U.S. Pat. No. 6,554,466 is rather complicated to handle. When the cap 14 is closed on the container 10, at first the press projection 140 of the cap 14 has to be aligned to the push button 13 and the slide groove 110, and then can be closed on the container 10, and further push the push button to shift so as to insert the press projection 140 in the chamber 12 of the sidearm 11 for pushing down the connect rod 15 to turn on the micro switch 160 to start the juicer. It is rather hard and complicated to handle.

SUMMARY OF THE INVENTION

The objective of the invention is to offer a juicer safety device usable conveniently and safely.

The main feature of the invention is to provide a juicer safety device includes:

a sidearm provided with a groove in a side of an upper end, a contact member fixed on an upper surface of a chamber of the sidearm, a spring placed at a front end of the contact member, a position guide member fixed on a sidewall of the upper end of the chamber, two projecting ridges formed in parallel near an intermediate portion of the chamber, a slide groove formed between the two projecting ridges;

a push rod set in the chamber of the sidearm and kept in position by the contact member, the position guide member and the two projecting ridges, and the push rod having a projecting block at an upper end, the projecting block having a stop edge formed at a first side, the projecting block having a second side pushed by the spring, a guide block provided near an intermediate portion of the push rod, the guide block fitting in the slide groove of the two projecting ridges;

a cap having a contact block at an outer edge, the contact block having a fitting groove for the projecting block of the push rod to fit with each other.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
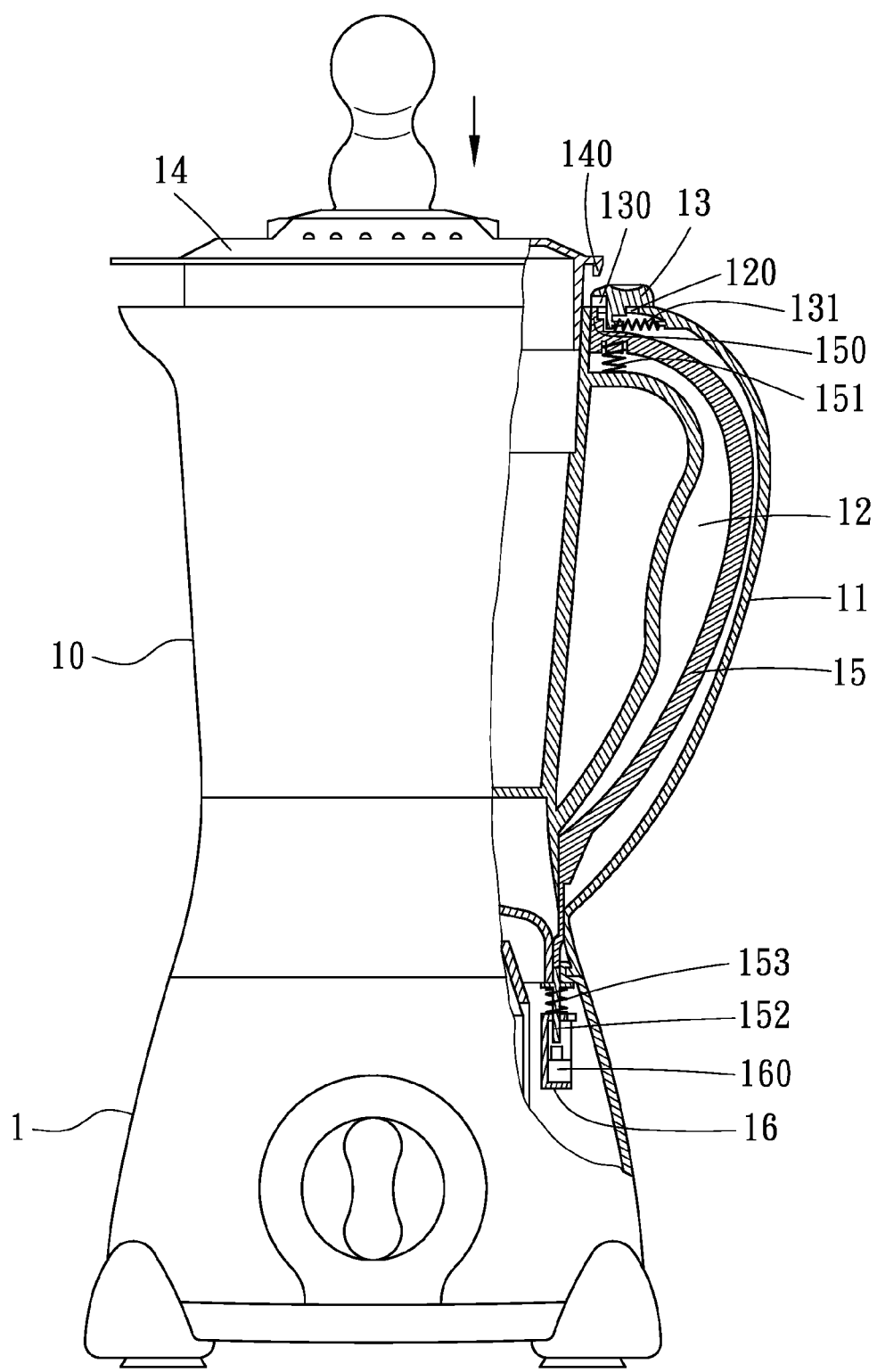
FIG. 1 is a side cross-sectional view of a conventional juicer, with a cap not yet closed on a container.
Figure 2:
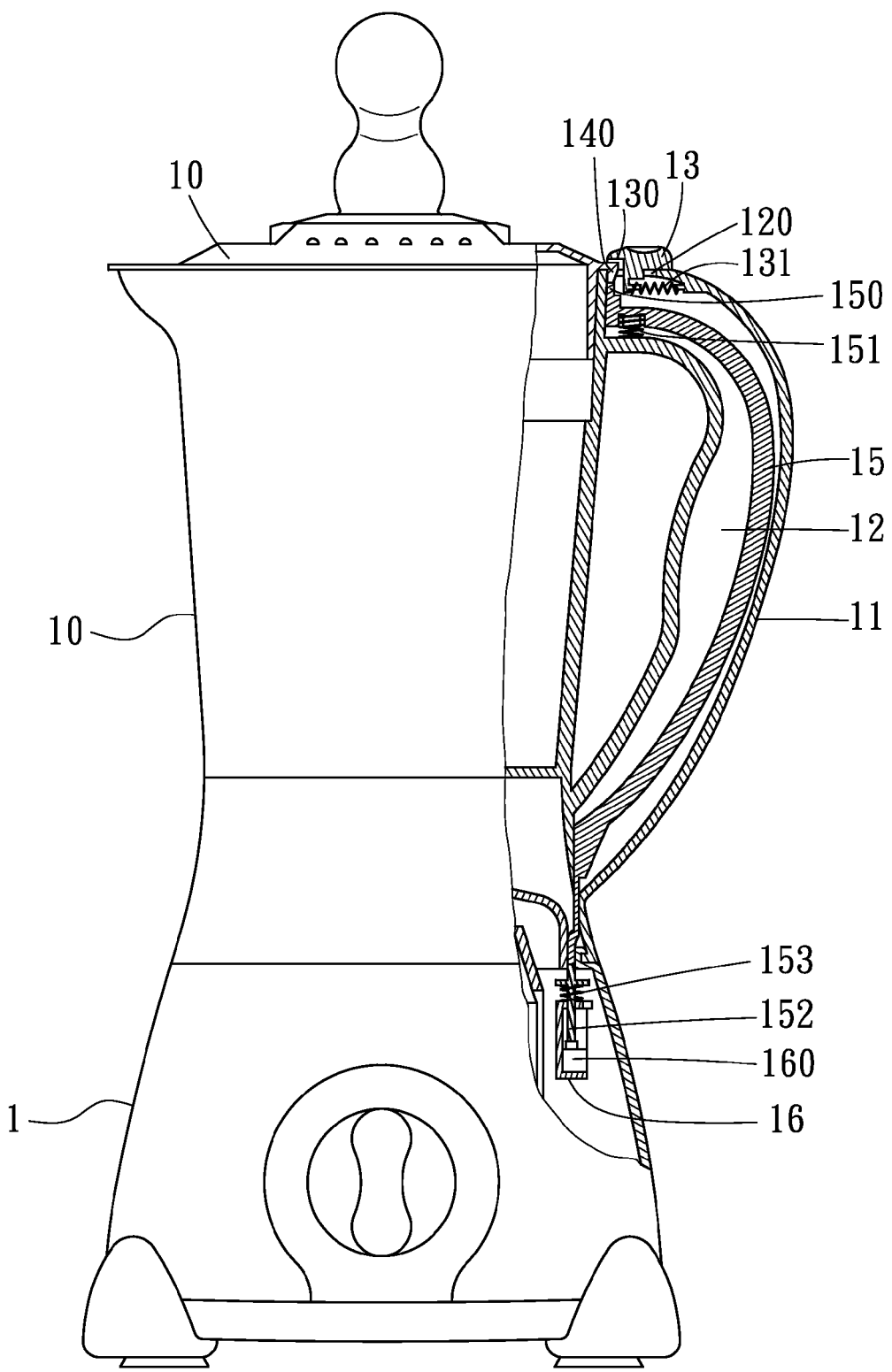
FIG. 2 is a side cross-sectional view of the conventional juicer, with the cap already closed on the container.
Figure 3:
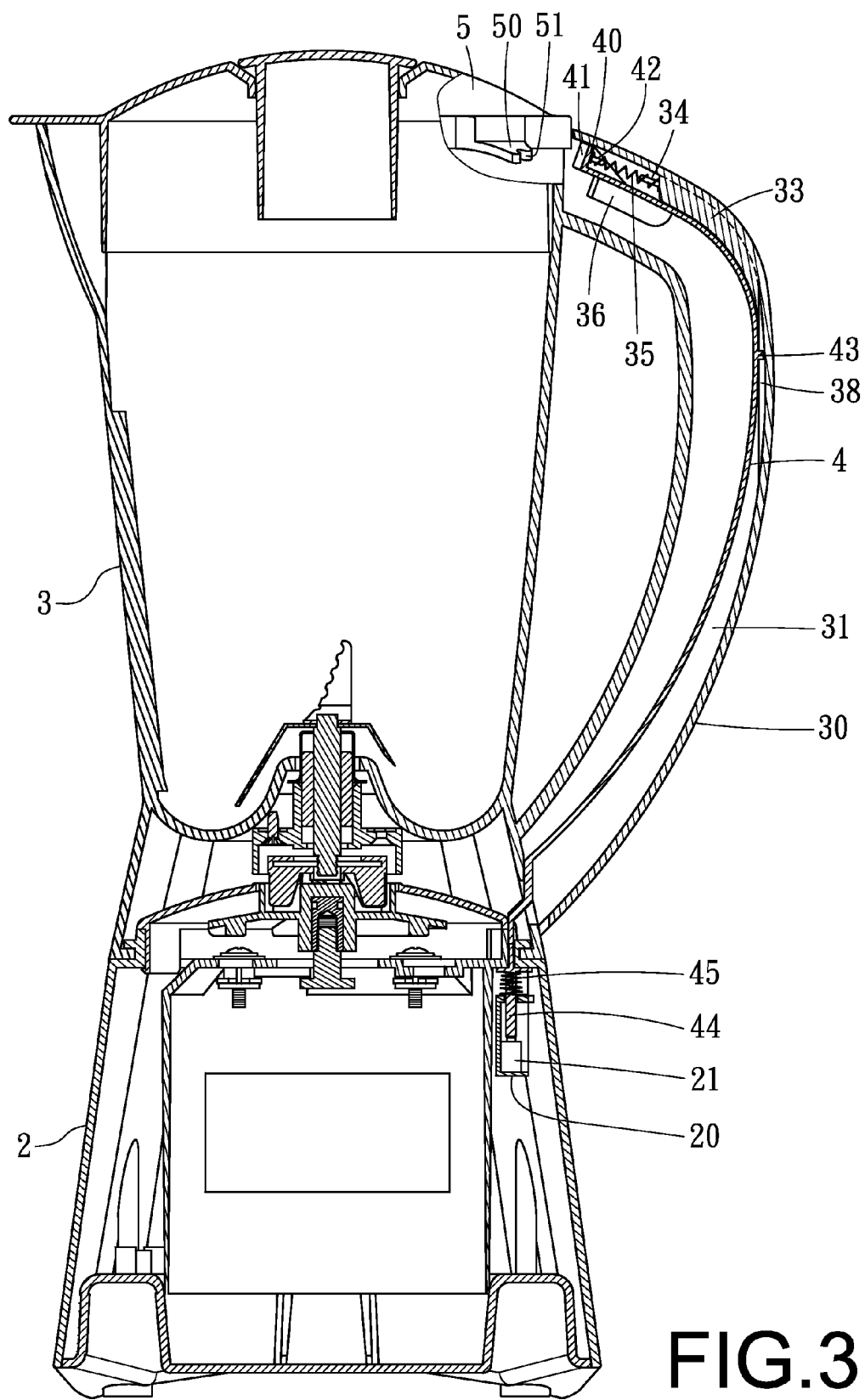
FIG. 3 is a side cross-sectional view of a juicer safety device in the present invention, showing a cap not yet rotated to close fittingly on a container.
Figure 4:
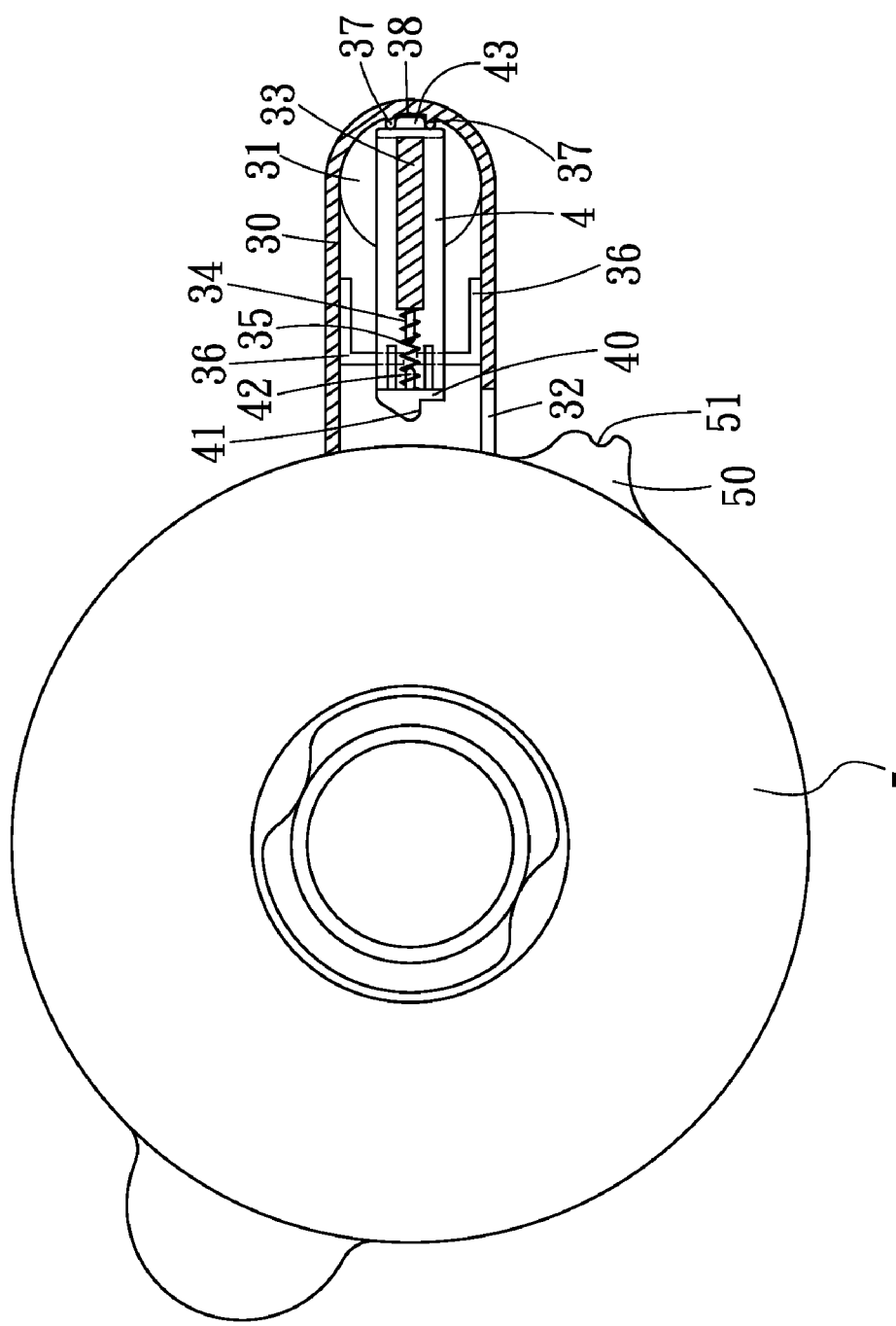
FIG. 4 is an upper view of the juicer safety device in the present invention, showing the cap not yet rotated to close fittingly on the container.
Figure 5:
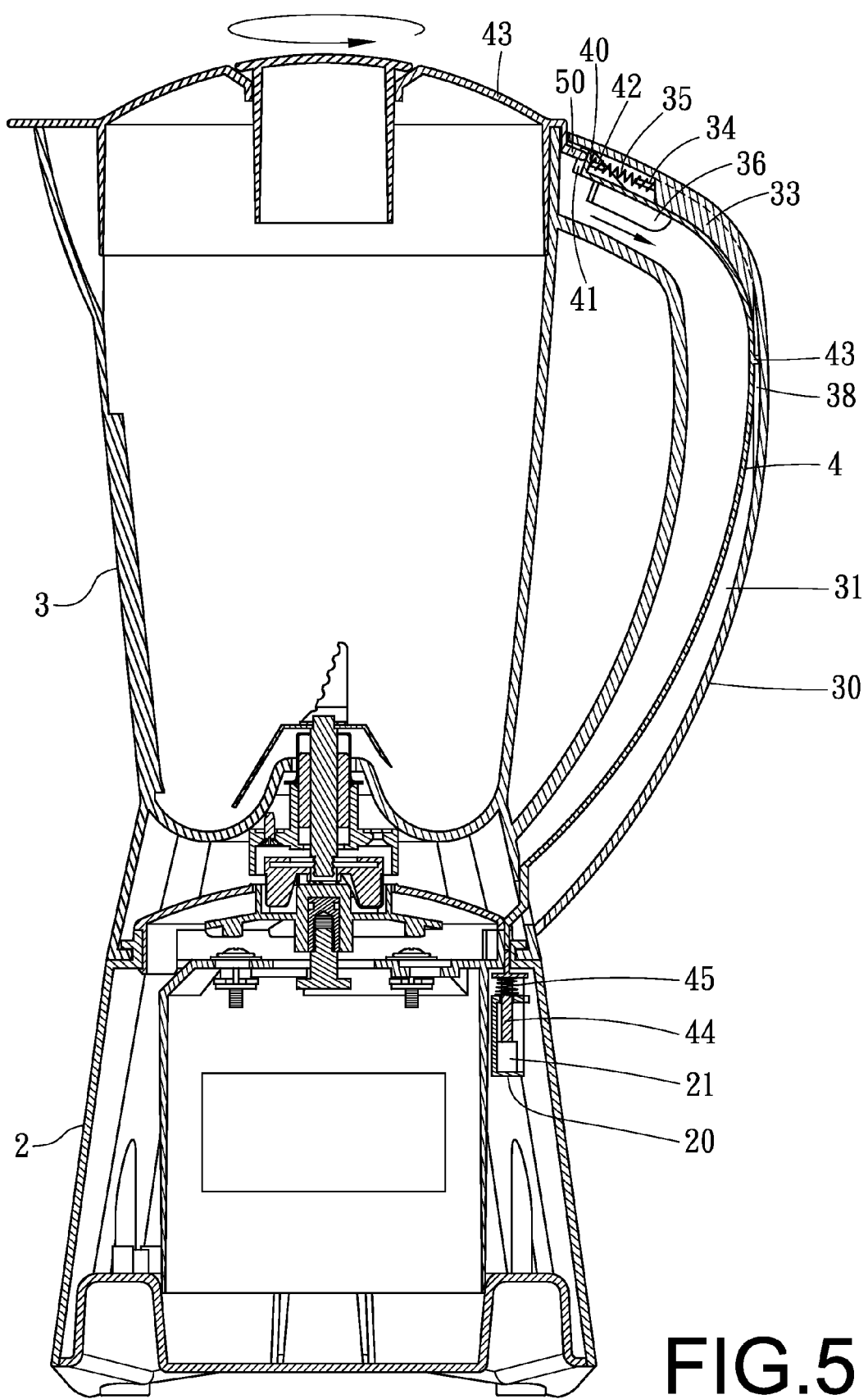
FIG. 5 is a side cross-sectional view of the juicer safety device in the present invention, showing the cap rotated to close fittingly on the container; and, FIG. 6 is an upper view of the juicer safety device in the present invention, shown the cap rotated to close fittingly on the container.
Figure 6:
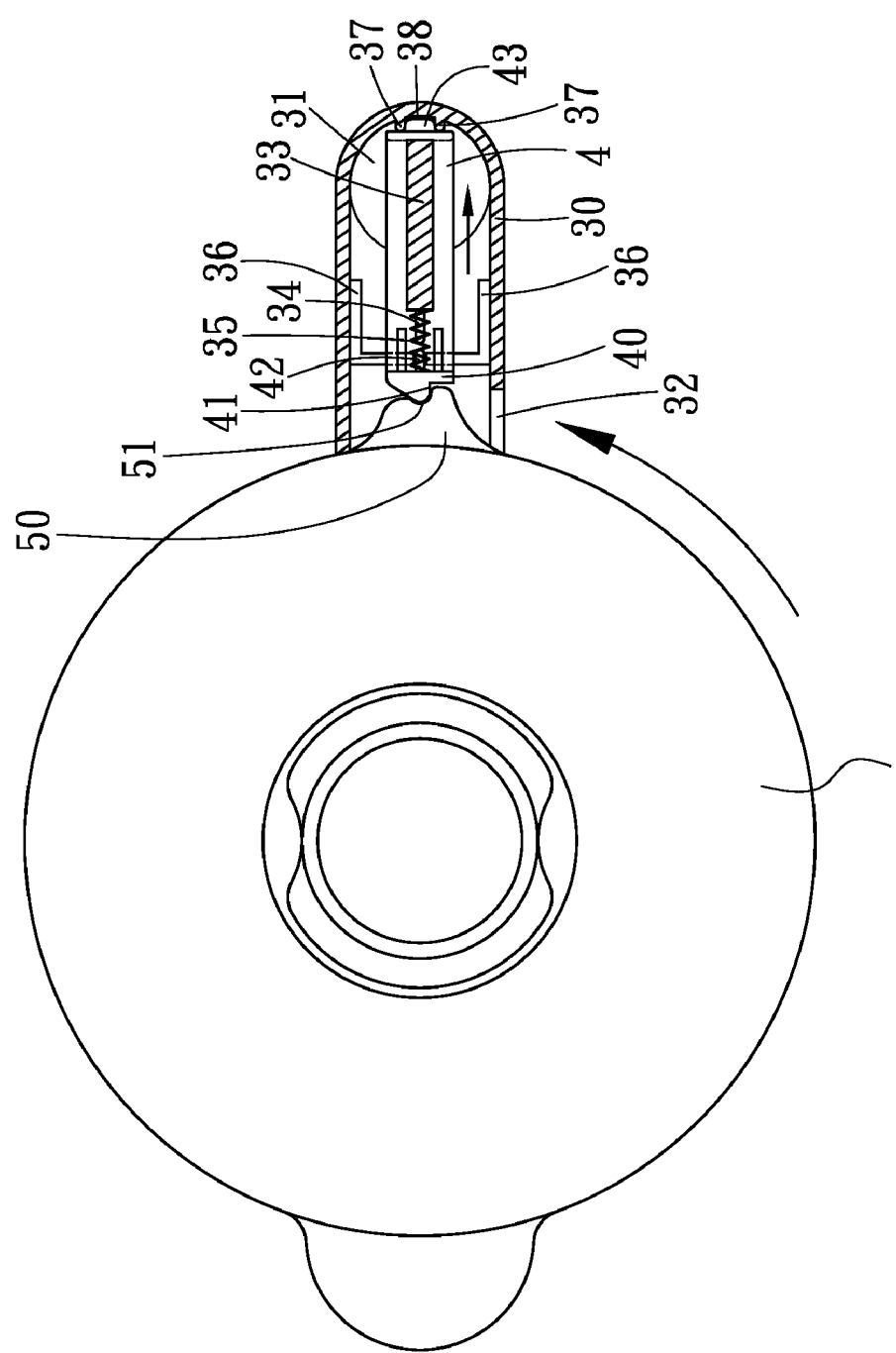

A preferred embodiment of a juicer safety device in the present invention, as shown in FIGS. 3 and 4, includes a main base 2, a container 3, a sidearm 30, a push rod 4, and a cap 5.

The main base 2 has a switch base 20 set in its interior, and a micro switch 21 fixed in the switch base 20.

The container 3 is formed on the main base 2, with the sidearm 30 formed at one side of the container 3, and the sidearm 30 is provided with a chamber 31 in its interior, with a groove 32 formed in a side of an upper end. Further, a contact member 33 is set on an upper surface of the chamber 31, a projection 34 formed on a front end of the contact member 33, and a spring 35 fitted around the projection 34. In addition, a position guide member 36 respectively is fixed on two sidewalls of an upper end of the chamber 31, and two projection ridges 37 with a slide groove 38 there between are formed on the wall near an intermediate portion of the chamber 31 of the sidearm 30.

The push rod 4 is deposited lengthwise in the chamber 31, kept in position by the contact member 33, the position guide member 36 and two projection ridges 37 and having a projection block 40 fixed on an upper end. The projecting block 40 has a stop edge 41 on a first side and a projection 42 on a second side for a second end of the spring 35 to hook with. The push rod 4 further has a guide member 43 near an intermediate portion, and the guide member 43 fits in the slide groove 38 between the two projection ridges 37. The push rod 4 also h a contact rod 44 fixed downward with a lower end, with a spring 45 fitted around the contact rod 44, and the lower end extends in the switch base 20 of the main base 2. Thus the contact rod 44 is located just on the micro switch 21 in the main base 2.

The cap 5 is closed on the container 3, having a contact block 50 on an outer surface, and the contact block 50 has a fitting groove 51 to fit tightly with the projecting block 40 of the push rod 4.

In using, as shown in FIG. 3-6, when a user does not yet close the cap 5 on the container 3, the contact rod 44 of the push rod 4 does not contact the micro switch 21 in the switch base 20, so the juicer is not yet turned on, in a turned off condition. Next, the cap 5 is closed on the container 3, and then rotated to let the contact block 50 of the cap 5 move into the chamber 31 of the sidearm 30 from the groove 32 of the sidearm 30. Then the contact block 50 may push the projecting block 40 of the push rod 4 in the sidearm 30, and then the push rod 4 together with projecting block 40 may slide down, with the guide member 43 sliding in the slide groove 38, so that the push rod 4 may move in a definite direction. In the meanwhile, the spring 35 on the first side of the upper end of the push rod 4 is compressed by the projecting block 40, so the contact rod 44 is pushed to move down to compress the spring 45, with the lower end of the contact rod 44 touch and turn on the micro switch 21, electrifying the juicer to operate for making juice.

After the juicer is cut off finishing operation, the cap 5 has to be rotated reversely, permitting the contact block 50 separate from the sidearm 30, and then the cap 5 is ready to be taken off. When the contact block 50 comes out of the sidearm 30, it no long pushes the projecting block 40 of the push rod 4, with the spring 35 recovering its elasticity to move back to its original position. At the same time, the push rod 4 is no more forced by the contact block 50, with the spring 45 recovering its elasticity to push upward the contact rod 44 together with the push rod 4 so that the micro switch 21 in the switch base 20 may be turned off, and thus the juicer is turned off. Then the juice made in the container 3 can be poured out for drinking. The safety device in the present invention involves the rotation of the cap 5 to move the push rod 4 down so as to turning on the micro switch 21, and the cap 5 is rotated directly to move into the sidearm 30 to touch and turn on the micro switch 21 after closed on the container 3, needing no alignment of any components, very convenient and safe to handle.

While the preferred embodiment of the invention has been described above, it will be recognized and understood that various modifications may be made therein and the appended claims are intended to cover all such modifications that may fall within the spirit and scope of the invention.

What is claimed is:

1. A juicer safety device comprising:
   a main base provided with a switch base in its interior, said switch base provided with a micro switch therein;
   a container formed on said main base, a sidearm formed at an outer side of said container and having a lengthwise hollow chamber;
   a push rod moveably fixed in said chamber of said sidearm, said push rod having a contact rod extending downward from its lower end, a spring fitted around said contact rod, said contact rod having its lower end protruding in said switch base of said main base and located just on said micro switch;
   a cap closing on said container; and,
   characterized in that
   said sidearm is provided with a groove in a side of an upper end, a contact member fixed on an upper surface of said chamber of said sidearm, a spring placed at a front end of said contact member, a position guide member fixed on a sidewall of said upper end of said chamber, two projecting ridges formed in parallel near an intermediate portion of said chamber, a slide groove formed between said two projecting ridges;
   said push rod is set in said chamber of said sidearm and kept in position by said contact member, said position guide member and said two projecting ridges, and said push rod has a projecting block at an upper end, said projecting block having a stop edge formed at a first side, said projecting block having a second side pushed by said spring, a guide block provided near an intermediate portion of said push rod, said guide block fitting in said slide groove of said two projecting ridges;
   said cap has a contact block at an outer edge, said contact block having a fitting groove for said projecting block of said push rod to fit with each other.

* * * * *